United States Patent [19]

Stapp

[11] Patent Number: 4,542,789

[45] Date of Patent: Sep. 24, 1985

[54] VISCOSITY ENHANCEMENT SYSTEM

[75] Inventor: Paul R. Stapp, Bartlesville, Okla.

[73] Assignee: Phillips Petroleum Company, Bartlesville, Okla.

[21] Appl. No.: 478,188

[22] Filed: Mar. 23, 1983

[51] Int. Cl.$^4$ .............................................. E21B 43/16
[52] U.S. Cl. ................................... 166/274; 166/275; 252/8.55 D; 252/356
[58] Field of Search .......................... 252/8.55 D, 356; 166/274, 275

[56] References Cited

U.S. PATENT DOCUMENTS

| | | | |
|---|---|---|---|
| 2,341,500 | 2/1944 | Detling | 252/8.55 D |
| 3,292,697 | 12/1966 | Abdo et al. | 166/273 |
| 3,292,698 | 12/1966 | Savins | 166/273 |
| 3,373,809 | 3/1968 | Cooke, Jr. | 166/273 |
| 3,410,343 | 11/1968 | Abdo | 166/274 |

Primary Examiner—Paul Lieberman
Assistant Examiner—Robert A. Wax

[57] ABSTRACT

A novel viscosity enhancing agent consisting essentially of urea and the sodium salt of an unsaturated carboxylic acid, and also, a viscosity enhanced fluid consisting essentially of salt water and the viscosity enhancing agent. In addition, a process for the enhanced recovery of oil employing the viscosity enhanced fluid as a mobility buffer.

16 Claims, No Drawings

VISCOSITY ENHANCEMENT SYSTEM

This invention relates to novel viscosity enhancing agents useful in the formation of viscosity enhanced fluids. It also relates to an improved process for oil recovery employing viscosity enhanced fluids as mobility buffers.

In the recovery of oil from oil-bearing reservoirs, it usually is possible to recover only a minor portion of the original oil by the so-called primary recovery methods which utilize only the natural forces present in the reservoir. Thus, a variety of supplemental recovery techniques have been employed in order to increase the recovery of oil from such reservoirs. In the supplemental techniques, which are commonly referred to as secondary recovery operations although in fact they may be primary or tertiary in sequence of employment, a variety of fluids are introduced into the reservoir in order to displace the oil therein and drive same to a suitable production system through which the displaced oil is withdrawn. The displacing fluids may be a gas, an aqueous liquid, such as fresh water or brine, an oil-miscible liquid such as butane, or a water and oil-miscible liquid such as alcohol.

One problem which often is encountered in secondary recovery operations is the relatively poor sweep efficiency of the injected displacing fluid. That is, the displacing fluid exhibits a tendency to channel through certain portions of the reservoir and to bypass other portions. Such poor sweep efficiency is occasioned by differences between the viscosity of the injected displacing fluid and the in situ reservoir oil and also by permeability variations within the reservoir. The reservoir may comprise a plurality of fairly well-defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in situ reservoir oil. In this situation, the less viscous displacing fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough of the displacing fluid at the production system.

Thus, various techniques have been proposed in order to improve the sweep efficiency of the injected displacing fluid and thus avoid premature breakthrough thereof. For example, it has been proposed in waterflooding operations to add thickening or viscosity enhancing agents to at least a portion of the aqueous flooding medium in order to increase the viscosity thereof. The viscosity of the flooding medium may be increased prior to its injection into the reservoir or alternatively the viscosity may be increased in situ in order to avoid a reduction in injectivity at the injection well.

Another proposal has been to employ viscosity enhanced fluids as mobility buffers in enhanced oil recovery. In the latter, surfactant slugs are introduced into oil-bearing reservoirs via one or more injection wells and the generation of a microemulsion results in-situ as the injected surfactant systems contact the oil in place. Following the surfactant slug, a mobility buffer is injected into the reservoir. The mobility buffer helps prevent fingering by the surfactant slug thereby increasing the efficiency of the oil recovery operation.

Because of their importance in oil recovery processes, there exists a continued need for new and efficient thickening or viscosity enhancing agents as well as viscosity enhanced fluids.

Therefore, it is an object of this invention to provide a viscosity enhancing agent for producing a viscosity enhanced fluid which is highly effective as a mobility buffer for enhanced oil recovery.

A further object of this invention is to provide an improved process for the recovery of oil employing a viscosity enhanced fluid as a mobility buffer.

Other aspects, objects, and advantages of the present invention are apparent from this specification and the claims.

In accordance with the present invention, I have discovered that viscosity enhanced fluids may be prepared from a combination of the sodium salt of an unsaturated carboxylic acid and urea in salt water. Such viscosity enhanced fluids have been further discovered to be particularly effective mobility buffers in enhanced oil recovery processes.

In accordance with one embodiment of the present invention there is provided a novel viscosity enhancing agent which consists essentially of the sodium salt of an unsaturated carboxylic acid and urea.

In accordance with another embodiment of this invention, there is provided a novel viscosity enhanced fluid consisting essentially of salt water and the above viscosity enhancing agent.

In still another embodiment of the present invention there is provided an improved process for the recovery of oil from oil bearing reservoirs utilizing the viscosity enhanced fluid of the present invention as a mobility buffer.

The sodium salts employed in the present invention are the sodium salts of $C_{12}$ to $C_{24}$ unsaturated carboxylic acids. Examples of such acids are oleic acid, ricinoleic acid, petroselinic acid, vaccenic acid, linoleic acid, linolenic acid, eleostearic acid, parinaric acid, arachidonic acid, cetoleic acid, erucic acid, and mixtures thereof. Presently preferred acids are oleic, ricinoleic, linoleic, and linolenic.

Broadly, from about 10–90 weight percent of urea and from about 90–10 weight percent of the sodium salt of an unsaturated carboxylic acid are present in the viscosity enhancing agent based upon the total weight of such. Preferably, from about 25–75 weight percent urea and about 75–25 weight percent sodium salt will be present.

Broad and preferred ranges for the ingredients of the viscosity enhanced fluids of this invention are shown in the following Table:

TABLE A

| Ingredient (parts by wt) | Broad Range | Preferred Range |
| --- | --- | --- |
| Water | 100 | 100 |
| Sodium Salt of Acid | .5–10 | 1–5 |
| Urea | .5–10 | 1–5 |
| NaCl | .1–15 | 1–10 |

While not required, a $C_1$ to $C_8$ alcohol may be present in the viscosity enhanced fluids. Examples of such alcohols are isobutyl alcohol, isopropyl alcohol, t-butyl alcohol, isoamyl alcohol, cyclohexanol, and mixtures thereof.

Broadly, from about 0.1–5 parts and preferably from about 0.1–2 by weight (based upon 100 parts by weight water) of the alcohol are present in the viscosity enhanced fluid.

The viscosity enhanced agents of this invention may be used as mobility buffers in enhanced oil recovery processes to recover oil from oil-bearing reservoirs. Such processes typically comprise injecting a surfactant slug into the oil bearing reservoirs via one or more injection wells. The surfactant slug is injected in an amount usually in the range of about 0.001 to 1.0, preferably 0.01 to 0.25 pore volume based on the pore volume of the total treated and produced formation. A microemulsion is formed in-situ as the injected surfactant system contacts the oil in place.

Following injection of the surfactant slug, a mobility buffer is injected into the formation. The injected mobility buffer will then aid in improving the sweep efficiency of the surfactant slug thereby increasing the total amount of oil recovered from the subterranean formation.

The following Examples illustrate the present invention.

EXAMPLE I

A series of 30 ml fluid samples containing salt water (1.5–5 wt %), urea (3 wt %), and sodium oleate (1.8 wt %) were prepared by mixture of the latter ingredients at the indicated weight percentages. The viscosity of each prepared sample was then measured with a Brookfield Viscometer (6 rpm @ 120 F.). The results are summarized in Table I.

TABLE I 1.8 Wt. % Sodium Oleate/3 Wt % Urea (1.5–5 Wt % NaCl)[a]

| Sample No. | NaCl (Wt %) | Viscosity (cP) (6 rpm @ 120 F.) |
|---|---|---|
| 1 | 1.5 | 3.5 |
| 2 | 2.0 | 32.2 |
| 3 | 2.2 | 33.2 |
| 4 | 2.4 | 38.8 |
| 5 | 2.6 | 47.6 |
| 6 | 2.8 | 51.4 |
| 7 | 3.0 | 23.5 |
| 8 | 5.0 | 5.9 |

[a]Weight percent based on total weight of composition.

The above data demonstrate in most instances (Samples 2–7) the enhanced viscosities of the inventive fluids.

EXAMPLE II

Further 30 ml samples were prepared to determine the viscosities of various fluids containing salt water (2.2 wt %), sodium oleate (1.8 wt %/3.6 wt %), urea, and isobutyl alcohol (IBA). The results are summarized in Table II.

TABLE II

Sodium Oleate (SO) System With Urea/IBA
In 2.2 Weight Percent Aqueous NaCl

| Sample No. | Wt % IBA[a] | Wt % Urea | Viscosity (cP) (6 rpm @ 120 F |
|---|---|---|---|
|  |  |  | @ 1.8 Wt % SO |
| 1 | 3.0 | 0.0 | 1.4 |
| 2 | 2.5 | 0.5 | 1.6 |
| 3 | 2.0 | 1.0 | 1.9 |
| 4 | 1.5 | 1.5 | 3.2 |

TABLE II-continued

Sodium Oleate (SO) System With Urea/IBA
In 2.2 Weight Percent Aqueous NaCl

| Sample No. | Wt % IBA[a] | Wt % Urea | Viscosity (cP) (6 rpm @ 120 F |
|---|---|---|---|
| 5 | 1.0 | 2.0 | 6.2 |
| 6 | 0.5 | 2.5 | 27.3 |
| 7 | 0.0 | 3.0 | 39.9 |
|  |  |  | @ 3.6 Wt % SO |
| 8 | 3.0 | 0.0 | 2.8 |
| 9 | 2.5 | 0.5 | 4.1 |
| 10 | 2.0 | 1.0 | 6.1 |
| 11 | 1.5 | 1.5 | 16.1 |
| 12 | 1.0 | 2.0 | 42.9 |
| 13 | 0.5 | 2.5 | NM[b] |
| 14 | 0.0 | 3.0 | NM[b] |

[a]Weight percent based on total weight of composition
[b]NM represents "Not Measured" @ 6 rpm/120 F The above data demonstrate in some instances (Samples 6, 11, and 12) that the replacement of part of the urea in the inventive fluid with isobutyl alcohol still results in a viscosity enhanced fluid.

EXAMPLE III

A series of samples were prepared to measure the viscosities of various fluids containing urea, salt water, and either potassium oleate or sodium oleate. Results are summarized in Table III.

TABLE III

Potassium Oleate (PO) and Sodium Oleate (SO)
Systems With 3 Weight Percent Urea in 2.2
Weight Percent Aqueous Salt

| Sample No. | Wt % Oleate[a] | Solution Viscosity (cP) |
|---|---|---|
|  |  | Potassium Oleate[b] |
| 1 | 3.6 | 2.5 |
| 2 | 2.7 | 2.5 |
| 3 | 1.8 | 2.0 |
| 4 | 1.2 | 1.9 |
| 5 | 0.9 | 2.5 |
|  |  | Sodium Oleate[c] |
| 6 | 3.6 | 91.0 |
| 7 | 2.7 | 88.6 |
| 8 | 1.8 | 66.4 |
| 9 | 1.2 | 6.9 |
| 10 | 0.9 | 3.2 |

[a]Weight percent based on total weight of composition.
[b]In 2.2 weight percent aqueous KCl
[c]In 2.2 weight percent aqueous NaCl The above data demonstrate that the use of potassium oleate in the fluid (Samples 1–3) does not result in viscosity enhancement as compared to the use of sodium oleate (Runs 6–8).

EXAMPLE IV

The viscosities of various fluids containing salt water, urea, isobutyl alcohol, and ingredient other than the sodium salt of a $C_{12}$–$C_{24}$ unsaturated carboxylic acid were measured. Results are summarized in Table IV.

TABLE IV

Solution Viscosities of Surfactant Systems With
IBA/Urea Cosurfactant (2.2 Wt % NaCl)

| Wt %[c] IBA | Wt %[c] Urea | SL[a] Viscosity (cP) | QUAT[b] Viscosity (cP) | SLS[c] Viscosity (cP) | SDBS[d] Viscosity (cP) |
|---|---|---|---|---|---|
| 3.0 | 0.0 | 1.2 | 1.2 | 1.5 | 2.0 |
| 2.5 | 0.5 | 1.2 | 1.4 | 1.6 | 2.0 |
| 2.0 | 1.0 | 1.1 | 1.4 | 1.6 | 2.1 |
| 1.5 | 1.5 | 1.1 | 1.5 | 1.7 | 2.1 |
| 1.0 | 2.0 | 0.9 | 1.1 | 1.7 | 2.2 |
| 0.5 | 2.5 | 1.0 | 1.1 | 4.2 | 2.0 |

TABLE IV-continued

Solution Viscosities of Surfactant Systems With
IBA/Urea Cosurfactant (2.2 Wt % NaCl)

| Wt %[e] IBA | Wt %[e] Urea | SL[a] Viscosity (cP) | QUAT[b] Viscosity (cP) | SLS[c] Viscosity (cP) | SDBS[d] Viscosity (cP) |
|---|---|---|---|---|---|
| 0.0 | 3.0 | 1.0 | 2.0 | 1.9 | 1.8 |

[a]SL represents sodium laurate
[b]QUAT represents cetyltrimethylammonium bromide
[c]SLS represents sodium lauryl sulfate
[d]SDBS represents sodium dodecylbenzene sulfonate
[e]Weight percent based on total weight of composition.

The above data indicate that the use of entities such as saturated carboxylic acids (SL) do not result in a viscosity enhanced fluid.

EXAMPLE V

Core Conditioning

The following conditioning procedure was used in preparing the waterwet Berea sandstone cores for the surfactantflooding tests of Examples VI and VII.

Berea sandstone cores measuring approximately 3 feet in length and 3 inches in diameter were dried under vacuum for 24 hours at 250 F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. This mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine Saturated Core Wt (g)} - \text{Dry Core Wt (g)}}{\text{Brine Density (g/mL)}} = \text{Core Pore Volume (mL)}$$

The brine-saturated core was oilflooded in the conventional manner until oil breakthrough became detectable by the presence of alternate globules of oil and water in the effluent line. The oilflood was carried out to completion by the 24 hour recycling of oil through the core to remove all of the displaceable water. The total water displaced, i.e., water displaced at the point of oil breakthrough and water displaced by the 24 hour recycle procedure was recorded as water displaced by oilflood. If desired, oil permeability was determined at a manner analogous to that used above for establishing original permeability in water. Prior to waterflood, the effluent line was air blown to remove oil.

The oilflooded core was waterflooded in the conventional manner until water breakthrough became detectable by the presence of alternate globules of oil and water in the effluent line. The waterflood was carried to completion by the 24 hour recycling of water through the core to remove all of the displaceable oil. The total oil displaced, i.e., oil displaced at the point of water breakthrough and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE VI

This example demonstrates the utility of the inventive enhanced viscosity fluid as a mobility buffer following surfactant slugs to facilitate the recovery of waterflood residual oil from Berea sandstone cores.

The surfactant slug contained a mixture of isobutyl alcohol (IBA) and N,N-dimethylformamide (DMF) as cosurfactant. The details of the Berea sandstone core conditioning is given earlier in Example V.

The surfactant slug had the following composition:
11.61 g Witco 10-410 (62 wt % active petroleum sulfonate)
3.6 g Isobutyl Alcohol (IBA)
2.4 g N,N-Dimethylformamide (DMF)
4.4 g Sodium chloride
178 g Arkansas-Burbank water (A-B water)
Thus, each component was present in the following weight percentages:

| Petroleum Sulfonate (active basis) | 3.6 wt % |
| IBA | 1.8 wt % |
| DMF | 1.2 wt % |
| NaCl | 2.2 wt % |
| A-B water | 91.2 wt % |

The mobility buffer slug had the following composition:
9 g Sodium Oleate
15 g Urea
11 g Sodium Chloride
465 g Arkansas-Burbank water
Thus, each component was present in the following weight percentages:

| Sodium Oleate | 1.8 wt % |
| Urea | 3.0 wt % |
| NaCl | 2.2 wt % |
| A-B Water | 93 wt % |

The pore volume of the 3"×3' cylindrical Berea sandstone core was 818 mL. A 61.35 mL (7.5% PV) slug of the above surfactant system was injected followed by 409 mL (0.5 PV) of the above mobility buffer which was continuously diluted with Arkansas-Burbank water, which is essentially fresh water containing less than 350 ppm total dissolved solids, during the course of injection.

In preparing the core, 565 mL of water, i.e., 2.2 wt % NaCl in Arkansas-Burbank water, was displaced from the water-saturated core by oilflood indicating the introduction of about 565 mL of oil into the core. Subsequent waterflood resulted in approximately 288 mL of oil being displaced from the core leaving about 277 mL of waterflood residual oil in the Berea sandstone core prior to the surfactant flood.

In the course of the surfactant flood, a total effluent of 1.67 pore volumes (ca. 1370 mL) was collected which contained 161.6 mL of tertiary oil representing about 58% of the waterflood residual oil, thus demonstrating the efficiency of enhanced viscosity fluid as mobility buffers.

EXAMPLE VII

This example demonstrates the use of the inventive enhanced viscosity fluid as a mobility buffer following the injection of a different petroleum sulfonate surfactant system.

The surfactant slug had the following composition:
11.61 g Witco 10-410 (62 wt % active petroleum sulfonates)
3.0 g IBA
3.0 g Urea
4.4 g Sodium Chloride
178 g Arkansas-Burbank water Thus, each component was present in the following weight percentages:

| Petroleum Sulfonate (active basis) | 3.6 wt % |
|---|---|
| IBA | 1.5 wt % |
| Urea | 1.5 wt % |
| NaCl | 2.2 wt % |
| A–B Water | 91.2 wt % |

The mobility buffer slug had the same composition as described in Example VI.

The pore volume of the 3"×3' cylindrical Berea sandstone core was 790 mL. A 59.25 mL (7.5% PV) slug of the above surfactant system was injected followed by 395 mL (0.5 PV) of the above mobility buffer diluted with Arkansas-Burbank water.

In preparing the core, 543 mL of water, i.e., 2.2 wt % NaCl in Arkansas-Burbank water, was displaced from the water-saturated core by oilflood indicating the introduction of about 543 mL of oil into the core. Subsequent waterflood resulted in approximately 262 mL of oil being displaced from the core leaving about 281 mL of waterflood residual oil in the Berea sandstone core prior to the surfactantflood.

In the course of the surfactantflood, a total effluent of 2.02 pore volumes (ca. 1600 mL) was collected which contained 186.3 mL of tertiary oil representing about 66% of the waterflood residual oil.

Reasonable modifications and variations are possible from the foregoing disclosure without departing from the scope and spirit of the present invention.

I claim:

1. A viscosity enhancing agent consisting essentially of:
    (a) from about 10–90 weight percent urea; and
    (b) from about 90–10 weight percent of the sodium salt of a $C_{12}$ to $C_{24}$ unsaturated carboxylic acid.

2. A viscosity enhancement system according to claim 1 consisting essentially of
    (a) from about 25–75 weight percent urea; and
    (b) from about 75–25 weight percent of said sodium salt of a $C_{12}$ to $C_{24}$ unsaturated carboxylic acid.

3. A viscosity enhancement agent according to claim 1 wherein said sodium salt is at least one selected from the group consisting of sodium oleate, sodium ricenoleate, sodium linoleate, and sodium linoleate.

4. A viscosity enhancement system according to claim 1 wherein said sodium salt is sodium oleate.

5. A viscosity enhanced fluid consisting essentially of:
    (a) 100 parts by weight water;
    (b) 0.5–10 parts by weight of a sodium salt of a $C_{12}$ to $C_{24}$ unsaturated carboxylic acid;
    (c) 0.5–10 parts by weight of urea; and
    (d) 0.1–15 parts by weight of NaCl.

6. A viscosity enhanced fluid according to claim 5 consisting essentially of:
    (a) 100 parts by weight water;
    (b) 1–5 parts by weight of said sodium salt;
    (c) 1–5 parts by weight of said urea;
    (d) 1–10 parts by weight of said NaCl.

7. A fluid according to claim 5 wherein said sodium salt is at least one selected from the group consisting of sodium oleate, sodium ricenoleate, sodium linoleate, and sodium linoleate.

8. A fluid according to claim 5 wherein said sodium salt is sodium oleate.

9. A fluid according to claim 5 further containing 0.1–5 parts by weight of a $C_1$ to $C_8$ alcohol.

10. A system according to claim 9 wherein said alcohol is isobutyl alcohol.

11. In a process for the recovery of oil from a subterranean reservoir comprising injecting a surfactant slug into said reservoir via one or more injection wells followed by the injection of a mobility buffer, the improvement which comprises utilizing as said mobility buffer a viscosity enhanced fluid consisting essentially of:
    (a) 100 parts by weight water;
    (b) 0.5–10 parts by weight of a sodium salt of a $C_{12}$ to $C_{24}$ unsaturated carboxylic acid;
    (c) 0.5–10 parts by weight of urea; and
    (d) 0.1–15 parts by weight of NaCl.

12. A process according to claim 11 wherein said fluid consists essentially of:
    (a) 100 parts by weight water;
    (b) 1–5 parts by weight of said sodium salt;
    (c) 1–5 parts by weight of said urea;
    (d) 1–10 parts by weight of said NaCl.

13. A process according to claim 12 wherein said sodium salt is at least one selected from the group consisting of sodium oleate, sodium ricenoleate, sodium linoleate, and sodium linolenate.

14. A process according to claim 11 wherein said sodium salt is sodium oleate.

15. A process according to claim 11 wherein said fluid further contains 0.1–5 parts by weight of a $C_1$ to $C_8$ alcohol.

16. A process according to claim 11 wherein said alcohol is isobutyl alcohol.